United States Patent [19]
Ito et al.

[11] Patent Number: 5,595,020
[45] Date of Patent: Jan. 21, 1997

[54] CONTINUOUS ASSEMBLY OF POTS FOR RAISING AND TRANSPLANTING SEEDLINGS

[75] Inventors: Sumio Ito; Hidekazu Terasawa; Yukio Sasaki, all of Obihiro, Japan

[73] Assignee: Nihon Tensaiseito Kabushiki Kaisha, Tokyo, Japan

[21] Appl. No.: 428,675

[22] Filed: Apr. 25, 1995

[30] Foreign Application Priority Data

Nov. 4, 1992 [JP] Japan .................................. 5-297585

[51] Int. Cl.⁶ ................................................ A01G 9/02
[52] U.S. Cl. ....................................... 47/66; 47/86
[58] Field of Search ............................ 47/66 A, 86, 87, 47/66 R

[56] References Cited

U.S. PATENT DOCUMENTS

| | | | |
|---|---|---|---|
| 3,164,507 | 1/1965 | Masuda | 47/66 A |
| 3,739,522 | 6/1973 | Greenbaum | 47/87 |
| 4,021,966 | 5/1977 | Rimpinen et al. | 47/86 |
| 4,167,911 | 9/1979 | Masuda et al. | 47/66 A |
| 5,058,320 | 10/1991 | Tsuru et al. | 47/66 A |
| 5,155,935 | 10/1992 | Tanimura et al. | 47/66 A |
| 5,257,475 | 11/1993 | Tanimura | 47/66 A |

FOREIGN PATENT DOCUMENTS

| | | | |
|---|---|---|---|
| 0137399 | 4/1985 | European Pat. Off. . | |
| 0316777 | 11/1988 | European Pat. Off. . | |
| 0474071 | 3/1992 | European Pat. Off. . | |
| 2199930 | 7/1973 | France . | |
| 2725220 | 12/1977 | Germany | 47/86 |
| 2007691 | 7/1975 | Japan | 47/66 A |
| 7708097 | 2/1978 | Netherlands | 47/86 |
| 8403665 | 6/1986 | Netherlands | 47/86 |
| 2011334 | 4/1994 | U.S.S.R. | 47/66 A |
| 2130064 | 5/1984 | United Kingdom | 47/66 A |

*Primary Examiner*—Terry Lee Melius
*Assistant Examiner*—Joanne C. Downs
*Attorney, Agent, or Firm*—Oliff & Berridge

[57] ABSTRACT

An assembly of pots for raising and transplanting seedlings. A plurality of cylindrical pots are made of paper and each pot is connected by a connection member into a continuous form. The connection member includes slits for allowing the spacing between adjacent pots to be elongated to a length corresponding to one intrarow spacing for various kinds of plants. The generally H-shaped or generally U-shaped slits can be vertically and alternatively provided from upper and lower edges of the connection member.

6 Claims, 2 Drawing Sheets

CONTINUOUS ASSEMBLY OF POTS FOR RAISING AND TRANSPLANTING SEEDLINGS

BACKGROUND OF THE INVENTION

1. Field of the Invention

The present invention concerns a continuous assembly of pots for raising and transplanting seedlings capable of pulling out individual pots in a continuous strip by connection members, each member having a predetermined width and length that is adjustable to an intrarow spacing of seedlings to be transplanted.

2. Related Art

Assembled pots for raising and transplanting seedlings comprising a plurality of tetragonal or hexagonal cylindrical bodies made of paper or other sheet material bonded with a water soluble adhesive have been used for raising and transplanting seedlings, for example, for rice patties, beets, vegetables and flowering trees.

The assembly of pots are folded compact during storage and developed upon use into a plurality of cylindrical pots into which soil is filled. Then, after seeding and raising the seedlings for several days, the plurality of pots are divided into individual pots and transplanted into the fields. Transplantation can be conducted automatically in a man-power-saving manner by using a transplanting machine.

In a conventional assembly of, for example, in Japanese Patent Publication Sho 55-30805, cylindrical pots are connected by means of connection members into strip-like continuous assembly of pots. Upon transplantation, the continuous assembly of pots are pulled out from one end and a preceding pot is disconnected from a succeeding pot by the connection member located between them and transplanted as an individual pot while being pulled.

In the case of a continuous assembly of pots for raising and transplanting seedlings in which each of the adjacent pots are connected by a connection member, a separation line for disconnecting each adjacent pot is disposed at a central portion of the connection member. The continuous assembly of pots are placed between a pair of upper and lower rollers rotating at different circumferential speeds and the separation line is disconnected gradually from a upper to a lower portion vertically in a long seedling pot, for example, in a case of beets. In a short seedling pot, such as for vegetables, when a preceding seedling pot is sized and pulled by a planting holder, a succeeding seedling pot is fixed by a stopper, thereby disconnecting the connection member along a separation line. Then, the separated seedling pot is planted into the field. In another conventional assembly of pots, Japanese Patent Publication Sho 54-28321 discloses a method of bonding individual pots by a predetermined interval into a long string by means of a water insoluble starch such that the pots are arranged continuously for a predetermined intrarow spacing upon transplantation. The continous assembly of pots are pulled out from one end upon transplantation and planted continuously in the form of a strip as they are planted into the field.

As described above, assembled pots separated into individual seedlings pots upon transplantation have been predominant in the prior art since planting spacings of the transplanted plants vary depending on the case. In the continuous assembly of pots for raising and transplanting seedlings capable of being pulled out continuously by connection members, they are manufactured not by appending a separate connection member to each of folded cylindrical members, but by manufacturing continuous assembly as shown in Japanese Patent Publication Sho 58-11817 or Japanese Patent Publication Hei 4-79612 by forming pot bodies and connection members from two paper rolls successively pulled out and integrated with each other. Two sheets of paper are laminated and bonded together by means of a water soluble starch at a predetermined length by coating water insoluble starch for ⅓ the length of a folded cylindrical member on every folded cylindrical member. As a result, when they are developed, they form an assembly of hexagonal honeycomb cylinders, and the portions bonded with the water insoluble starch constitute connection members upon transplantation. Although, this is an effective manufacturing method, the portion coated with the water insoluble starch can not exceed ⅓ the length of the folded cylindrical body because the length of the connection member is always restricted to ⅓ the length of the folded pot member. For example, in practicing a method proposed by the present applicant in Japanese Patent Application Hei 4-142080 of successively pulling out and planting the continuous assembly of pots for raising and transplanting seedlings in the form of a continuous strip from a skid-like sliding body while maintaining the continuous strip, the planting spacing is always fixed to an intrarow spacing limited to ⅓ the pot length. Thus the above method can be applied only to a restricted range of planting spacings.

Further, in a continuous assembly of pots for raising and transplanting seedlings in which each of the pots is connected by means of a string at a predetermined spacing, as disclosed in Japanese Patent Publication Sho 54-28321, it is required that the string, which is different in view of the material and the shape from those of the pot be bonded in a troublesome operation, by water soluble and insoluble starches at a predetermined spacing to each of the pots while folding them.

SUMMARY OF THE INVENTION

In view of the foregoing problems, the present inventor has made an earnest study for obtaining continuously assembled pots for raising and transplanting seedlings capable of planting seedlings in the developed state at a predetermined intrarow spacing that is adjustable for the planting spacing of seedlings to be transplanted while pulling out the assembled pots continuously from one end to the other end in succession. As a result, while taking notice on a method developed by the present applicant as disclosed in Japanese Patent Application Hei 4-142080 mentioned above, the present invention attains a continuous assembly of pots for raising and transplanting seedlings capable of planting seedlings at a predetermined intrarow spacing by merely pulling out the assembly continuously without separating them into individual pots by disposing slits on a connection member on a lateral side of a pot, thereby making the spacing of the connection member extensible between each of the pots for addressing the intrarow spacing for each of seedlings to be transplanted, and then transplanting them in the developed state.

The continuous assembles of pots for raising and transplanting seedlings according to the present invention are suitable to use for plants having an intrarow spacing of about 10 cm, such as welsh onions, Chinese chives, spinach and chrysanthemums, and the pot used for this purpose usually has a relatively small diameter of about 2 to 3 cm. If the weight of the pot filled with the soils is too heavy, then the heavy weight tends to exert forces on the connection member and cause disconnection.

For connecting seedling pots by connection members into continuously assembled pots for raising and transplanting seedlings and planting them in the connected state, the present in Japanese Patent Application Hei 4-142080, previously described, mounting the continuous assembly of pots for raising and transplanting seedlings on a skid-like plate member having side frames that slide on the upper surface of the farm yard and pulling out the continuously assembled pots for raising and transplanting seedlings successively from the delivery portion disposed at the back of the skid-like plate member in accordance with the running of the skid-like plate member, thereby enabling to plant seedlings on hallows.

However, since the continuously assembled pots for raising and transplanting seedlings are connected each by a connection member having a length equal to each side of the hexagonal shape, the intrarow spacing upon planting has been restricted to the narrow length of the connection member. The present invention makes it possible to conduct transplanting operation at a planting interval in accordance with the intrarow spacing of seedlings to be transplanted in which the length of the connection member is extended in accordance with the planting spacing by disposing slits to the connection member or to the lateral side of the pot.

In the present invention, any sheet material for the conection member can be used satisfactorily provided that the extensible connection member has enough strength to withstand the pulling force exerted when pulling out the pots upon planting. For example, existent synthetic fiber paper formed by mixing synthetic fibers in a paper-making process, corrosion resistant paper as disclosed in Japanese Patent Publication Hei 2-23640 in which the wet strength is increased by treating synthetic fiber mixed paper with a chemical agent, non-corrosive non-woven sheet and paper formed by treating natural pulp and synthetic fiber mixed paper with corrosion inhibitor such as a sterilizer as disclosed in Japanese Patent Publication Sho 59-20325 can be used as materials for the connection member.

DESCRIPTION OF THE PREFERRED EMBODIMENTS

Various shapes of slits for making a connection member that connects each of pots are shown with reference to the drawings.

Figure 1:
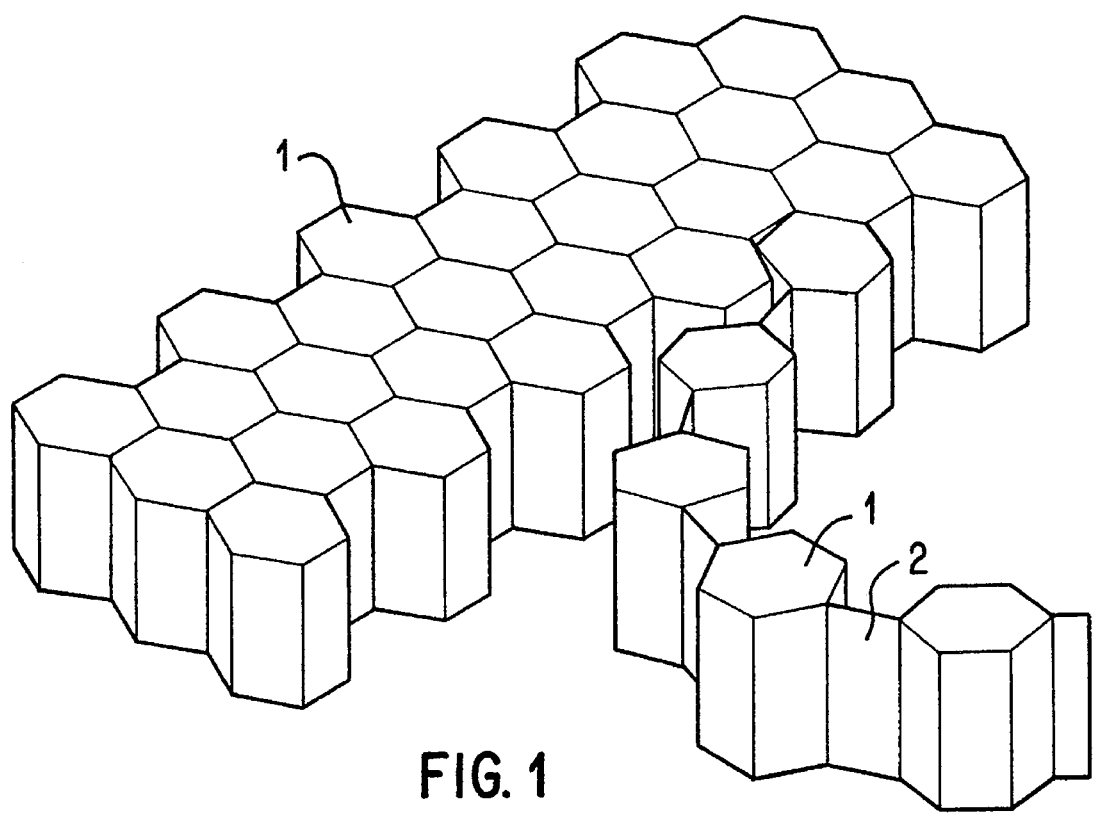
FIG. 1 is a perspective view of a preferred embodiment of continuous assembly of pots for raising and transplanting seedlings in a developed state according to the present invention.
Figure 2:
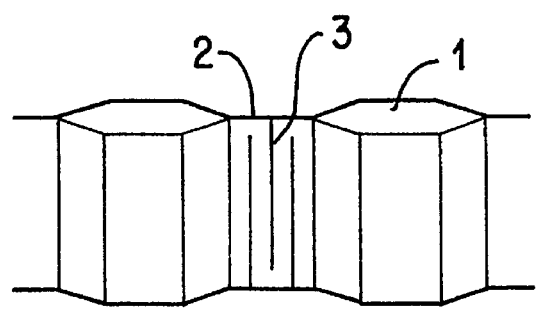
FIG. 2 is a side elevational view of a preferred embodiment of slits disposed Lo a connection member in the present invention.
Figure 3:
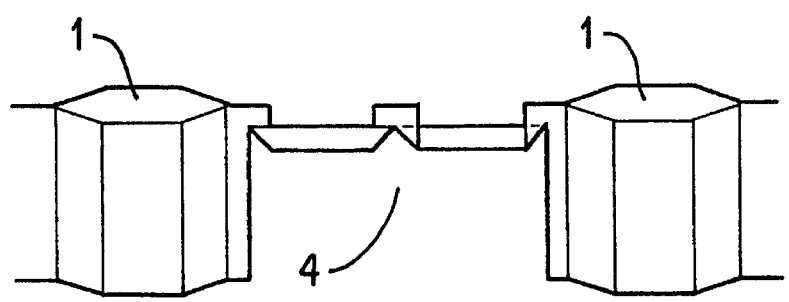
FIG. 3 is a side elevational view when the slits disposed to the connection member shown in FIG. 2 are extended.
Figure 4:
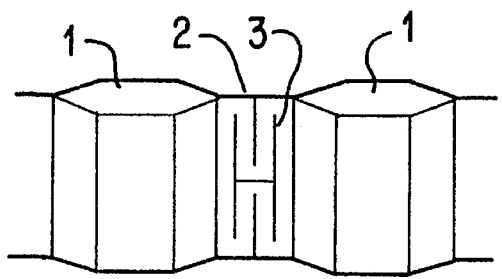
FIG. 4 is a side elevational view of another embodiment of slits disposed to a connection member in the present invention.
Figure 5:
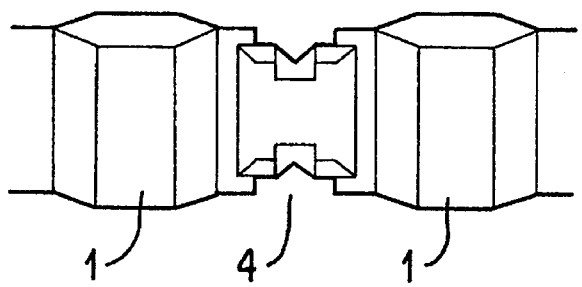
FIG. 5 is a side elevational view when the slits disposed to the connection member shown in FIG. 4 are extended.
Figure 6:
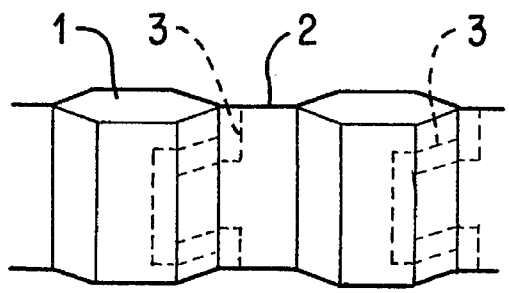
FIG. 6 is a side elevational view of a further embodiment of slits disposed to a connection member in the present invention.
Figure 7:
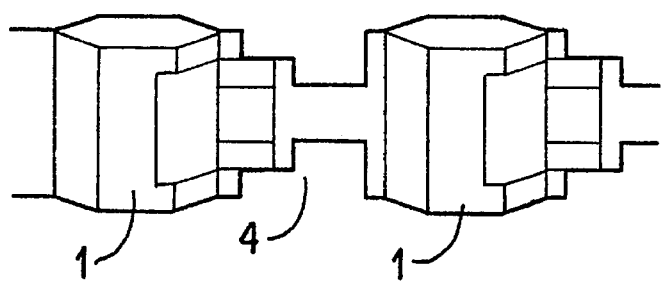
FIG. 7 is a side elevational view when the slits disposed to the connection member shown in FIG. 6 are extended.

A connection member 2 for connecting pots 1 of assembled pots for raising and transplanting seedlings shown in FIG. 1 has slits 3 as shown in FIGS. 2, 4 and 6 (in FIG. 6 slits are shown in a dotted line) for making the connection member extensible, by which the connection member 2 is extended as shown in FIGS. 3, 5 and 7 upon transplantation while maintaining seedling pots in a continuous state. The shape of the slits includes, for example, a plurality of slits 3 formed alternately along a vertical direction from upper and lower sides to the connection member as shown in FIG. 2, slits 3 comprising an H-shaped slit and upper and lower slits formed at a central portion of the H-shaped slit formed to the connection member as shown in FIG. 4, or U-shaped slits 3 formed from the base of the connection member to both adjacent lateral sides of the pot as shown in FIG. 6. Each of the connection members provided with the slits described previously is extended upon transplantation as shown in FIGS. 3, 5 or 7.

The extended length of the connection member in the present invention can be varied optionally depending on the diameter and the height of the pot, and the number and the length off the slits. The size of the pot and the shape of the slit can be selected such that they can sufficiently withstand the tensile force and enable satisfactory transplantation while pulling out the assembled pots to be kept in a continuous state, by taking into account the intrarow spacing suitable to the plants to be transplanted, the weight of culturing medium in the pot, etc., into consideration.

In the present invention, since the slits 3 are disposed to the connection member 2 or both lateral sides of the pot 1 of the continuous assembly of pots for raising and transplanting seedlings in which each of the pots 1 is connected by means of the connection member, the slits 3, upon pulling out the assembled pots successively from one end continuously in a strip, are extended in the pulling out direction to provide an extended connection member 4. Then, the assembled pots are pulled out continuously and seedlings can be transplanted in accordance with the intrarow spacing of the seedlings to be transplanted with the spacing between each of the adjacent pots 1 being extended From the initial length of the connection member 2.

EXAMPLE 1

Corrosion resistant paper of 50 g/m² of unit area weight prepared by treating with dimethylol dihydroxyl ethylene urea as a corrosion inhibitor is successively delivered from a paper roll, and a water resistant adhesive (acrylic emulsion adhesive) was coated on the paper in a direction perpendicular to the delivering direction for a length of 14.5 mm and at a 43.5 mm pitch. Meanwhile, corrosion resistant paper prepared by the same treatment is delivered out of another paper roll and then appended on the above-mentioned corrosion resistant paper to form a continuous strip. In the strip, the adhesive coating portion constitutes a connection member and an adhesive non-coating portion constitutes a pot portion. 44 units each comprising six coating areas of 14.5 mm length and six non-coating areas of 43.5 mm length were alternately folded right-to-left and bonded with a water soluble adhesive (polyvinyl alcohol type adhesive). The thus folded continuously assembled pots for raising and transplanting seedlings are developed into continuously assembled pots for raising and transplanting seedlings in which hexagonal cylindrical pots each having 14.5 mm a length of 14.5 mm on each side were connected by means of a connection member of 14.5 mm length, and the height of the pot was 50 mm. Slits of 40 mm height were disposed vertically each at 3.625 mm interval to the adhesive coating portion of the strip alternatively by using a three rotary cutter. Culture soils were filled and seeds of Chinese chive were seeded and raised for 30 days. Then, the continuously assembled pots for raising and transplanting seedlings were set to a grounded type continuous seedling pot pulling out transplanting machine having a transplanting seedling mounting portion sized 320 mm×800 mm and running at a speed of 0.6 m/min for transplantation. Transplantation for 1.0 are was completed within 0.2 hours by 14 sets with no intermediate disconnection and transplantation could be conducted satisfactorily.

Further, the intrarow spacing was also satisfactory as 1300 mm/10 of the planted intrarow spacing relative to the calculated length of 116 mm of the extended connection member.

EXAMPLE 2

A non-woven sheet of 50 g/m² of unit area weight prepared by blending vinylon fibers of 1 denier×6 mm as the basic material and easily soluble PVA binder fibers of 1 denier×3 mm were blended at 3:1 ratio and subjecting to a paper making process was delivered successively. A water resistant adhesive (EVA hot melt) was coated on the paper in a direction perpendicular to the delivering direction for a length of 17.8 mm and at a 53.4 mm pitch. Meanwhile, non-woven sheet by the same treatment is delivered out of another paper roll and then appended on the above-mentioned corrosion resistant paper to form a continuous strip. In the strip, the adhesive coating portion constitutes a connection member and an adhesive non-coating portion constitutes a pot portion. 36 units each comprising five coating areas of 17.8 mm length and five non-coating areas of 53.4 mm length were alternately folded right-to-left and bonded with a water soluble adhesive (polyvinyl alcohol type adhesive). The thus folded continuously assembled pots for raising and transplanting seedlings were developed into continuously assembled pots for raising and transplanting seedlings in which hexagonal cylindrical pots with 17.8 mm side were connected by means of a connection member of 17.8 mm length, and the height of the pot was 75 mm. An H-shaped slit (60 mm height for each of right and left vertical lines and 8.9 mm length for central horizontal line) is formed to a central portion of the adhesive coating portion of the strip, and slits each of 30 mm height were formed vertically from corresponding upper and lower side edges at a center between each of right and left vertical lines by using a rotary cutter. Culture soils were filled and seeds of spinach were seeded and raised for 25 days. Then, the continuously assembled pots for raising and transplanting seedlings were set to a grounded type continuous seedling pot pulling out transplanting machine having a transplanting seedling mounting portion sized 320 mm×800 mm and running at a speed of 0.6 m/min. Transplantation for 1.0 are was completed within 0.3 hours by 20 sets with no intermediate disconnection and transplantation could be conducted satisfactorily.

Further, the intrarow spacing was also satisfactory as 1000 mm/10 of the planted intrarow spacing relative to the calculated length of 90 mm of the extended connection member.

EXAMPLE 3

A paper roll of unbleached craft paper of 60 g/m² of unit area weight prepared by a paper making process with addition of 1% by weight of 8-oxyquinoline copper as a sterilizer to craft pulp was successively delivered. A water resistant adhesive (vinyl acetate type adhesive) was coated on the paper in a direction perpendicular to the delivering direction for a length of 14.5 mm and at a 43.5 mm pitch. Meanwhile, unbleached craft paper prepared was delivered out of another paper roll and then appended on the above-mentioned paper to form a continuous strip. In the strip, the adhesive coating portion constitutes a connection member and a adhesive non-coating portion constitutes a pot portion. 44 units each comprising six coating areas of 14.5 mm length and six non-coating areas of 43.5 mm length were alternately folded right-to-left and bonded with a water soluble adhesive (polyvinyl alcohol type adhesive). The thus folded continuously assembled pots for raising and transplanting seedlings were developed into continuously assembled pots for raising and transplanting seedlings in which hexagonal cylindrical pots with 14.5 mm side were connected by means of a connection member of 14.5 mm length, and the height of the pot was 37.5 mm. U-shaped slits comprising 43.5 mm lateral lines and 26 mm vertical line were disposed from the base end of the bonded portion to the non-adhesive coating area of the strip by using a rotary cutter. Cultures soil were filled and seeds of lettuce were seeded and raised for 20 days. Then, the continuously assembled pots for raising and transplanting seedlings were set to a grounded type continuous seedling pot pulling out transplanting machine having a transplanting seedling mounting portion sized 320 mm×800 mm and running at a speed of 0.8 m/min for transplantation. Transplantation for 1.0 are was completed within 0.3 hours by 12 sets with no intermediate disconnection and transplantation could be conducted satisfactorily.

Further, the intrarow spacing was also satisfactory as 1350 mm/10 of the planted intrarow spacing relative to the calculated length of 116 mm of the extended connection member.

In the continuous assembly of pots for raising and transplanting seedlings according to the present invention, the length of the connection member between each of the pots is made extensible by the slits disposed to the connection member or both lateral sides of the pot. The assembled pots can be applied to a wider range of plants to be transported by optionally varying the adjustable length.

In addition, in the continuous assembly of pots for raising and transplanting seedlings according to the present invention, the extension of the connection member can be adjusted easily by merely stacking two sheets one above the other, disposing the bonding portion and the non-bonding portion and providing a plurality of slits to the bonding portion or the non-bonding portion. Further the assembled pots can be manufactured extremely easily.

What is claimed is:

1. An assembly of pots for raising and transplanting seedlings, comprising:

a plurality of cylindrical pots made of paper, each pot connected by a connection member to at least one adjacent pot to form the assembly, the connection member including slits for allowing a spacing between each adjacent pot to be elongated to a length corresponding to one intrarow spacing, wherein the slits on the connection member are vertically and alternately provided from upper and lower edges of the connection member, each slit having a length shorter than a vertical length of the connection member.

2. The assembly of pots for raising and transplanting seedlings according to claim 1, wherein each adjacent pot is bonded to each other by means of a water soluble adhesive.

3. An assembly of pots for raising and transplanting seedlings, comprising:

a plurality of cylindrical pots made of paper, each pot connected by a connection member to at least one adjacent pot to form the assembly, the connection member including slits for allowing a spacing between each adjacent pot to be elongated to a length corresponding to one intrarow spacing, wherein the slits provided on the connection member are generally H-shaped.

4. The assembly of pots for raising and transplanting seedlings according to claim 3, wherein each generally H-shaped slit extends in a vertical direction from upper and lower edges of the connection member.

5. An assembly of pots for raising and transplanting seedlings, comprising:

a plurality of cylindrical pots made of paper, each pot connected by a connection member to at least one adjacent pot to form the assembly, the connection member including slits for allowing spacing between each adjacent pot to be elongated to a length corresponding to one intrarow spacing, wherein the slits provided on the connection member are generally U-shaped.

6. The assembly of pots for raising and transplanting seedlings according to claim 5, wherein each generally U-shaped slit extends laterally from a base of the connection member to sides of the pot.

* * * * *